United States Patent
Bergkvist et al.

(10) Patent No.: US 9,161,202 B2
(45) Date of Patent: Oct. 13, 2015

(54) METHOD AND A DEVICE FOR ROAMING IN A LOCAL COMMUNICATION SYSTEM

(75) Inventors: Pelle Bergkvist, Trellebord (SE); Andreas Anderberg, Hjarup (SE)

(73) Assignee: U-BLOX AG, Thalwil (CH)

( * ) Notice: Subject to any disclaimer, the term of this patent is extended or adjusted under 35 U.S.C. 154(b) by 0 days.

(21) Appl. No.: 13/812,381

(22) PCT Filed: Jul. 12, 2011

(86) PCT No.: PCT/SE2011/050944
§ 371 (c)(1),
(2), (4) Date: Jan. 25, 2013

(87) PCT Pub. No.: WO2012/015353
PCT Pub. Date: Feb. 2, 2012

(65) Prior Publication Data
US 2013/0273909 A1    Oct. 17, 2013

(30) Foreign Application Priority Data

Jul. 26, 2010  (SE) ...................................... 1050830

(51) Int. Cl.
*H04W 4/00*     (2009.01)
*H04W 8/02*     (2009.01)
(Continued)

(52) U.S. Cl.
CPC ................ *H04W 8/02* (2013.01); *H04W 36/18* (2013.01); *H04W 24/04* (2013.01); *H04W 88/02* (2013.01)

(58) Field of Classification Search
CPC ....... H04W 8/02; H04W 36/18; H04W 24/04; H04W 88/02
USPC ........ 455/432.1, 434, 448, 444; 370/331, 338
See application file for complete search history.

(56) References Cited

U.S. PATENT DOCUMENTS

| 5,717,688 A | 2/1998 | Belanger et al. |
| 8,270,414 B2 * | 9/2012 | Oi et al. ......................... 370/400 |

(Continued)

FOREIGN PATENT DOCUMENTS

| WO | 0208857 A2 | 1/2002 |
| WO | 2004/002208 A2 | 8/2004 |

OTHER PUBLICATIONS

Nilsson, R., "Achieving Redundant and Seamless Wireless Roaming when Using Standard Access Points," Apr. 8, 2011, Retrieved from the Internet: URL:http://www.connectblue.com/press/articles/redundant-and-seamless-wireless-roaming/ (6 pgs.).

(Continued)

*Primary Examiner* — Kaship Siddiqui
*Assistant Examiner* — Mong-Thuy Tran
(74) *Attorney, Agent, or Firm* — Fredrikson & Byron, P.A.

(57) ABSTRACT

A local communication network (16) comprising a first client communication unit (10) and at least one second communication unit (12), and a method of roaming. The client communication units comprise a first interface unit (14) and a second interface unit (18) for connecting to said local communication network (16) and a remote network (20), respectively, and a bridging unit (22). The client communication units are operative in a first mode, in which said first client communication unit (10) bridges traffic between said local communication network (16) and said remote communication network (20) through a first communication path, and in a second mode, in which said second communication unit (12) scans for an alternative second communication path. A roaming control unit (24) determines whether the alternative second communication path is preferred over said first communication path. If this is the case mode of operation is switched and bridging is taken over by said second client communication unit (12).

9 Claims, 4 Drawing Sheets

(51) Int. Cl.
 _H04W 36/18_ (2009.01)
 _H04W 24/04_ (2009.01)
 _H04W 88/02_ (2009.01)

(56) References Cited

U.S. PATENT DOCUMENTS

| | | | |
|---|---|---|---|
| 2002/0055978 A1* | 5/2002 | Joon-Bo et al. | 709/209 |
| 2002/0069278 A1* | 6/2002 | Forslow | 709/225 |
| 2002/0085719 A1 | 7/2002 | Crosbie | |
| 2003/0005160 A1* | 1/2003 | Schaefer | 709/248 |
| 2004/0156384 A1 | 8/2004 | Rune et al. | |
| 2004/0221046 A1* | 11/2004 | Heinonen et al. | 709/227 |
| 2005/0086273 A1* | 4/2005 | Loebbert et al. | 707/204 |
| 2005/0238047 A1* | 10/2005 | Holland et al. | 370/465 |
| 2006/0133414 A1* | 6/2006 | Luoma et al. | 370/466 |
| 2006/0166674 A1* | 7/2006 | Bennett et al. | 455/445 |
| 2006/0187873 A1 | 8/2006 | Friday et al. | |
| 2006/0221993 A1 | 10/2006 | Liao et al. | |
| 2007/0288585 A1* | 12/2007 | Sekiguchi et al. | 709/209 |
| 2009/0279520 A1* | 11/2009 | Maki | 370/338 |
| 2011/0222522 A1 | 9/2011 | Akil et al. | |
| 2012/0106321 A1* | 5/2012 | Alon et al. | 370/221 |
| 2013/0130667 A1* | 5/2013 | Wilson | 455/416 |

OTHER PUBLICATIONS

"International Search Report dated Dec. 15, 2011 for PCT/SE2011/050944, from which the instant application is based," (4 pgs.).

Article 94(3) Communication for EP Application No. 11771285.1 dated Jul. 7, 2014, 7 pages.

\* cited by examiner

METHOD AND A DEVICE FOR ROAMING IN A LOCAL COMMUNICATION SYSTEM

RELATED APPLICATIONS

This application is a 35 U.S.C. 371 national stage filing from International Application No. PCT/SE2011/050944 filed Jul. 12, 2011 and claims priority to Swedish Application No. 1050830-7 filed Jul. 26, 2010, the teachings of which are incorporated herein by reference.

TECHNICAL FIELD

The invention relates to a method and a device for roaming in a local communication system. The term "roaming" originates from GSM technology, which refers to the ability to move from one wireless network to another without loosing a voice connection. The same concept can be used for any other wireless technology to carry any stream of data from one wireless network to another. The concept also can be applied in wired systems.

PRIOR ART

The details of the roaming process differ among different types of cellular networks and other networks. When a mobile device is transferred from a first network to a second network a handover process normally is used. In cellular telecommunications the term handover or handoff refers to the process of transferring an ongoing call or data session from one channel connected to the core network to another. In satellite communications it is the process of transferring satellite control responsibility from one earth station to another without loss or interruption of service.

Handovers also can be divided into hard and soft handovers. A hard handover is one in which the channel in the source cell is released and only then the channel in the target cell is engaged. Thus the connection to the source is broken before the connection to the target is made. Hard handovers are intended to be instantaneous in order to minimize the disruption to the call. In practice the disruption during hard handovers in many applications constitutes a substantial problem.

A soft handover is one in which the channel in the source cell is retained and used for a while in parallel with the channel in the target cell. In this case the connection to the target is established before the connection to the source is broken. The interval, during which the two connections are used in parallel, may be brief or substantial and may lead to problems with regard to protocols. Problems also may arise with network looping during the parallel services.

Another problem with various wireless technologies is that scanning for new wireless networks affects the performance of the wireless connection that is in use.

SUMMARY OF THE INVENTION

An object of the present invention is to overcome the problems set out above and to achieve roaming without any notable connection losses. In accordance with the invention at least two cooperating communication units each having an interface are used to achieve roaming. Utilizing several independent communication units also opens the opportunity of combining roaming with redundancy.

A local communication network at a client side comprises a first client communication unit and at least one second communication unit, said first client communication unit and said at least one second communication unit each comprising a first interface unit, said first interface unit providing a communication path between said local communication network and a remote communication network. The local communication network forms a local link that is used for communication between the client communication units operating as bridging devices to the remote communication network.

In various embodiments the client communication units form wireless clients communicating with the remote network through wireless access points. The wireless clients act as bridges, forwarding packets from the local communication network to the remote communication network and v.v. In order to prevent network loops only one of the clients is allowed to bridge packets at the same time. This mechanism is controlled by a protocol, which uses the local link (local link=a network connection between the clients e.g. an Ethernet network) in order to prepare and execute roaming and redundancy.

It should be noted that both roaming and redundancy can be achieved irrespective of the communications protocols and techniques used. The inventive concept can be used both in wired as well as wireless and radio systems and combinations thereof.

In various embodiments the local communication network operates under a predefined protocol. The protocol defines three device modes of the wireless clients: Master, Slave and Available, also referred to as first mode, second mode and third mode. When the wireless clients reboots they will enter the Available device mode. The goal of the protocol is then to elect one Master and one Slave on the local link. The Master will be the device that is in charge of roaming etcetera by controlling the Slave over the local link.

An active Master maintains a wireless connection with the remote communication network and bridges data from the local communication network to an access point of the remote communication network. The Master instructs an associated Slave to start scanning for a connection having improved transmission properties. Different criteria of improvement can be determined in different systems. Examples of criteria are a better Received Signal Strength Indicator (RSSI) or an access point that is included in a list of preferred access points. Also other criteria can be used. During scanning there are not performance losses since the exchange of information is handled by the Master.

If the Slave detects a more preferred connection the Master may initiate roaming by instructing the Slave to establish communication over the new link. When the Slave has established communication there will in fact be two simultaneous wireless connections between the local communication network the remote communication network. However, only the Master will bridge packets and handle communication at this point.

After receiving a notification that the Slave has established communication the Master will initiate a Role Switch and instruct the Slave to change mode. After the process of a Role Switch the former Slave will become the Master and vice versa. Bridging immediately will be taken over by the new Master while the former Master turns it of. The former Master now being a Slave disconnects the present connection and is instructed to start scanning for another as set out above.

The Master and the Slave continuously will monitor the function of each other. A polling scheme can be used. Should the Master detect a failure of the Slave a search for a wireless client in the Available mode is performed. If an Available client is found the Master will elect it as a Slave and instruct the client accordingly. Should a Slave detect failure of the associated Master it will change mode of operation and become a Master. Communication will be resumed immediately and a search for a Slave is performed among clients that are in the Available mode.

It should be noted that all specific features of the invention are present at the client side. As a result the remote communication network can be a standard configuration using standard wireless hardware and no specific firmware.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
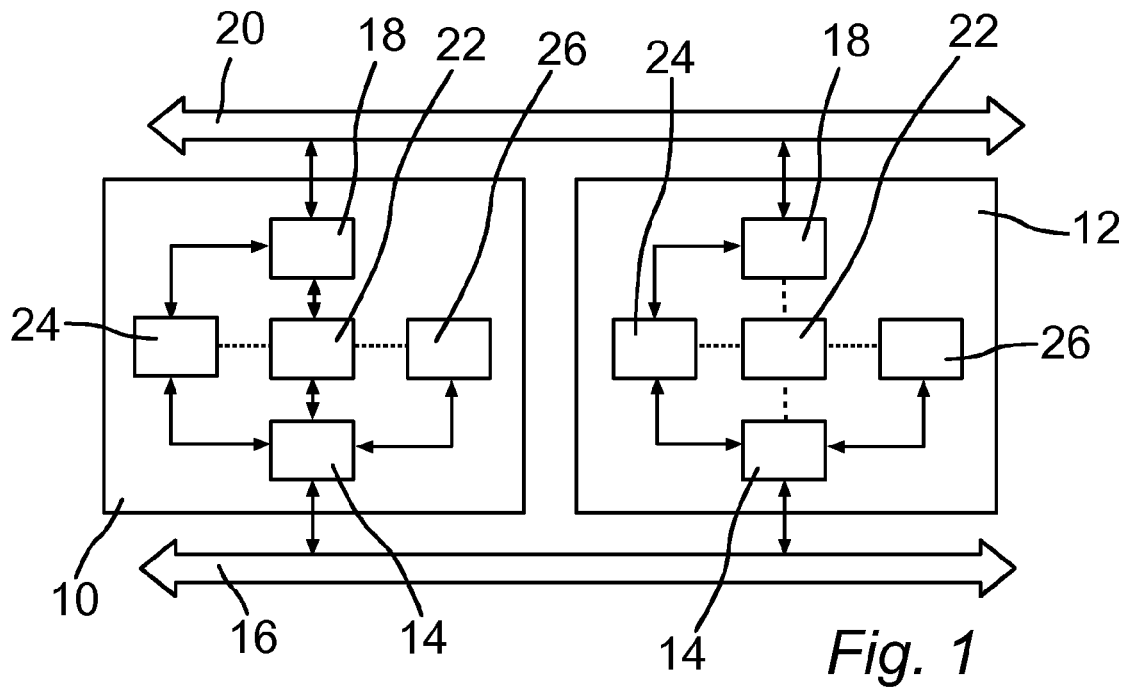
FIG. 1 is a schematic block diagram of one embodiment of a system in accordance with the invention.

The schematic block diagram of FIG. 1 shows a first client communication unit 10 and a second client communication unit 12. In various embodiments the first client communication unit 10 and the second client communication unit 12 are identically equipped and comprise first interface units 14 for communication over a local link network 16.

Figure 2:
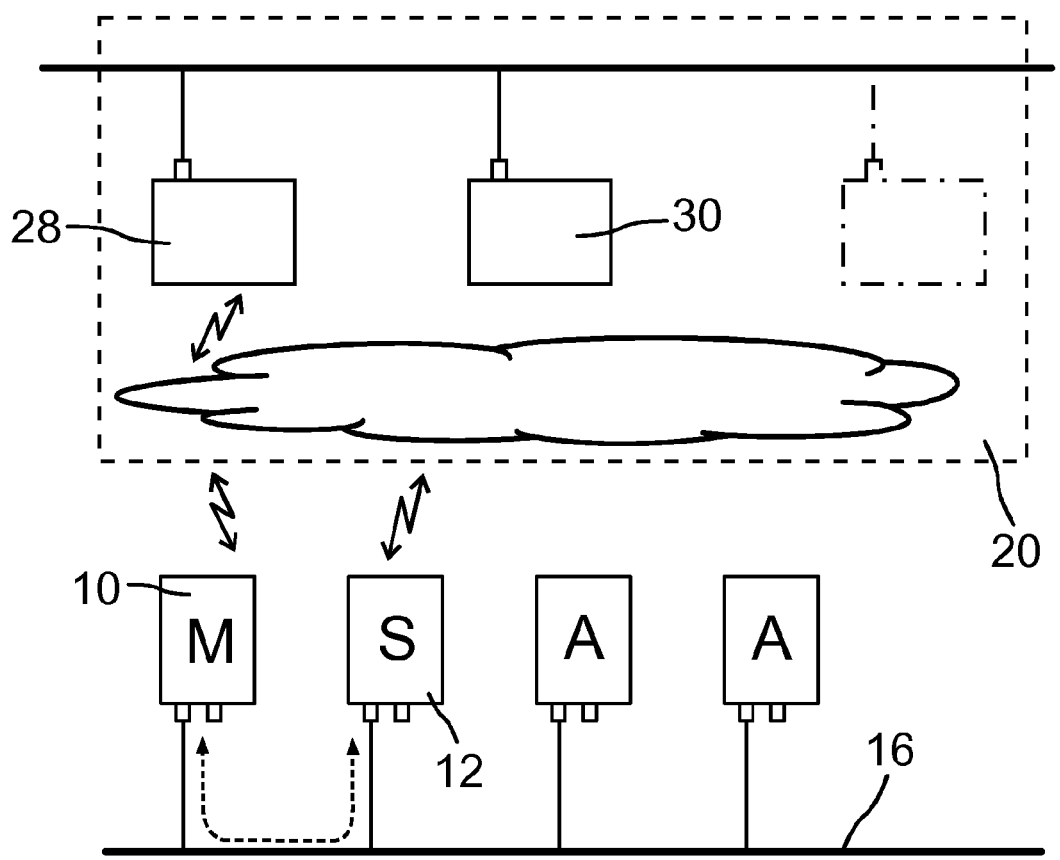
FIG. 2 is a schematic block diagram of one embodiment of a wireless system in accordance with the invention.

The first client communication unit 10 and the second client communication unit 12 also comprise second interface units 18 for communication over a remote network 20. In various embodiments the remote network is a wireless network and the second interface units 18 are wireless interface units. In such embodiments the remote network 20 comprises a plurality of access points, c.f. FIG. 2.

In the embodiment shown in FIG. 1 the first client communication unit 10 operates as a Master and is bridging data between the local link network 16 and the remote network 20 through a bridging unit 22. Bridging in this context corresponds to a process of transparently exchanging data over a first communication path. A roaming control unit 24 of the first client communication unit 10 communicates through said first interface units 14 with a roaming control unit 24 of the second client communication unit 12 operating as a Slave. The roaming control unit 24 comprises means for determining whether another communication path is preferred over the present first communication path. The local link network 16 and the remote network 20 can be either wired systems, wireless systems or any combination thereof.

The Master has selected a Slave from any number of communication units in the Available mode. In various embodiments the selected Slave continuously informs the Master about present communication data, such as the Received Signal Strength Indicator (RSSI). Other information that can be transferred from the Master to the Slave includes a list of preferred Access Points. The Slave is instructed by the Master to scan for Access Points that may offer an improved transmission quality and thereby to provide an alternative second communication path.

When operating as a Slave the second client communication unit 12 continuously scans for an alternative communication path through an alternative access point. If an alternative communication path is found information in this regard is sent to the first client communication unit 10 through the local link network. It should be noted that during the scanning process performed by the Slave there are no capacity losses in the communication performed by the Master. The roaming control unit 24 of the Master determines on the basis of the information received from the Slave if a roaming procedure is to be initiated.

The first client communication unit 10 and the second client communication unit 12 also comprise a timer or watch dog unit 26. The watch dog unit 26 of the client communication unit acting as a Master expects a timely poll request from the corresponding watch dog unit of the client communication unit acting a Slave. When the Master receives a poll request a reply is sent from the Master watch dog unit to the Slave watch dog unit and a timer of the Master watch dog unit is reset. Receipt of the poll request and the reply, respectively, is used in a fail detection arrangement as set out below.

In the installation shown in FIG. 2 four first client communication units are connected by wire to the local link network 16. One first client communication unit is marked M and operates as a Master. A second client communication unit is marked S and operates as a Slave. The two further client communication units are marked A and are acting as Available and therefore are not actively engaged.

All bridging, that is communication between networks, is handled transparently by the Master unit through the first communication path to the remote network 20. As shown in FIG. 2 the remote network 20 forms a wireless connection and comprises a plurality of access points. A first access point 28 presently is involved in the communication between the networks. A second access point 30 and a plurality of further access points presently are not involved. The first access point 28 corresponds to the first communication path. The Slave communication unit and the Master communication unit communicate through the local link network to exchange data regarding the present transmission quality and possible alternative communication paths. The local link network may be a conventional Ethernet network.

The Master unit M communicates an instruction to the Slave unit S through the local link network to start a scanning process. The object of scanning process is to locate an access point that is preferred over the first access point 28. In various embodiments the Slave unit S continuously reports back to the Master unit M about alternative communication paths and found alternative access points.

When the Slave unit S have located the second access point 30 the roaming control unit 24 of the Master unit compares transmission properties and other aspects of the first access point 28 and the second access point 30. If the roaming control unit 24 of the Master unit determines that the second access point 30 has more desirable transmission properties or is more preferred for other reasons the Master unit M will notify the Slave unit S to start a process of connecting to the second access point 30. During the connecting process the bridging through the Master unit M continues.

Figure 3:
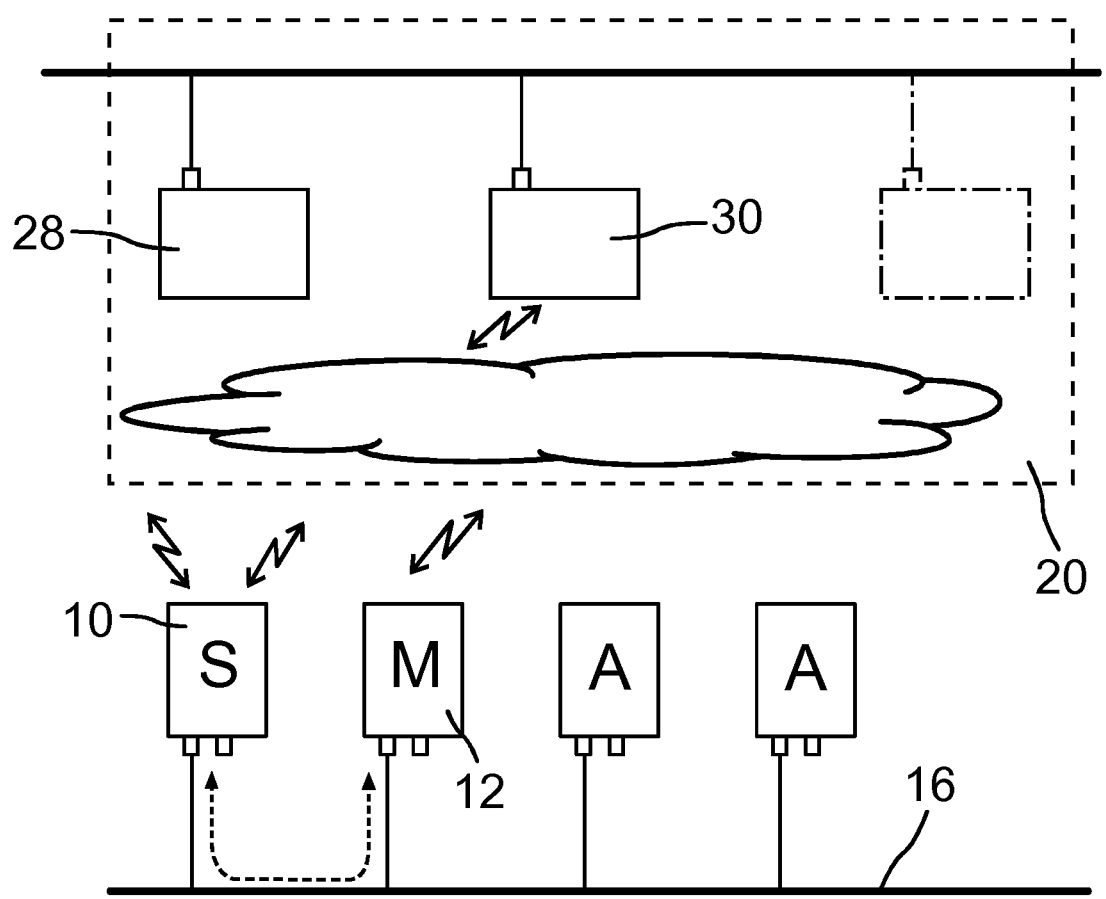
FIG. 3 is a schematic block diagram of the embodiment of FIG. 2 after a role switch operation.

Even after a completion of the connecting process and an established connection through the second access point 30 the bridging through the first access point 28 continues. When the connecting process has been completed and a full connection through the second access point 30 is at hand the Slave unit S informs the Master unit M accordingly. The Master unit M then sends a role switch instruction to the Slave unit S to become a new Master unit as shown in FIG. 3.

After taking over the position as a Master also the bridging of communication is taken over and moved to the second access point 30 providing a second communication path. This step will complete the roaming procedure. The former Master unit becomes a Slave unit S having a disconnected wireless connection. The new Master unit sends instructions to the new Slave unit S to start the process of scanning for an alternative communication path as set out above.

Figure 4:
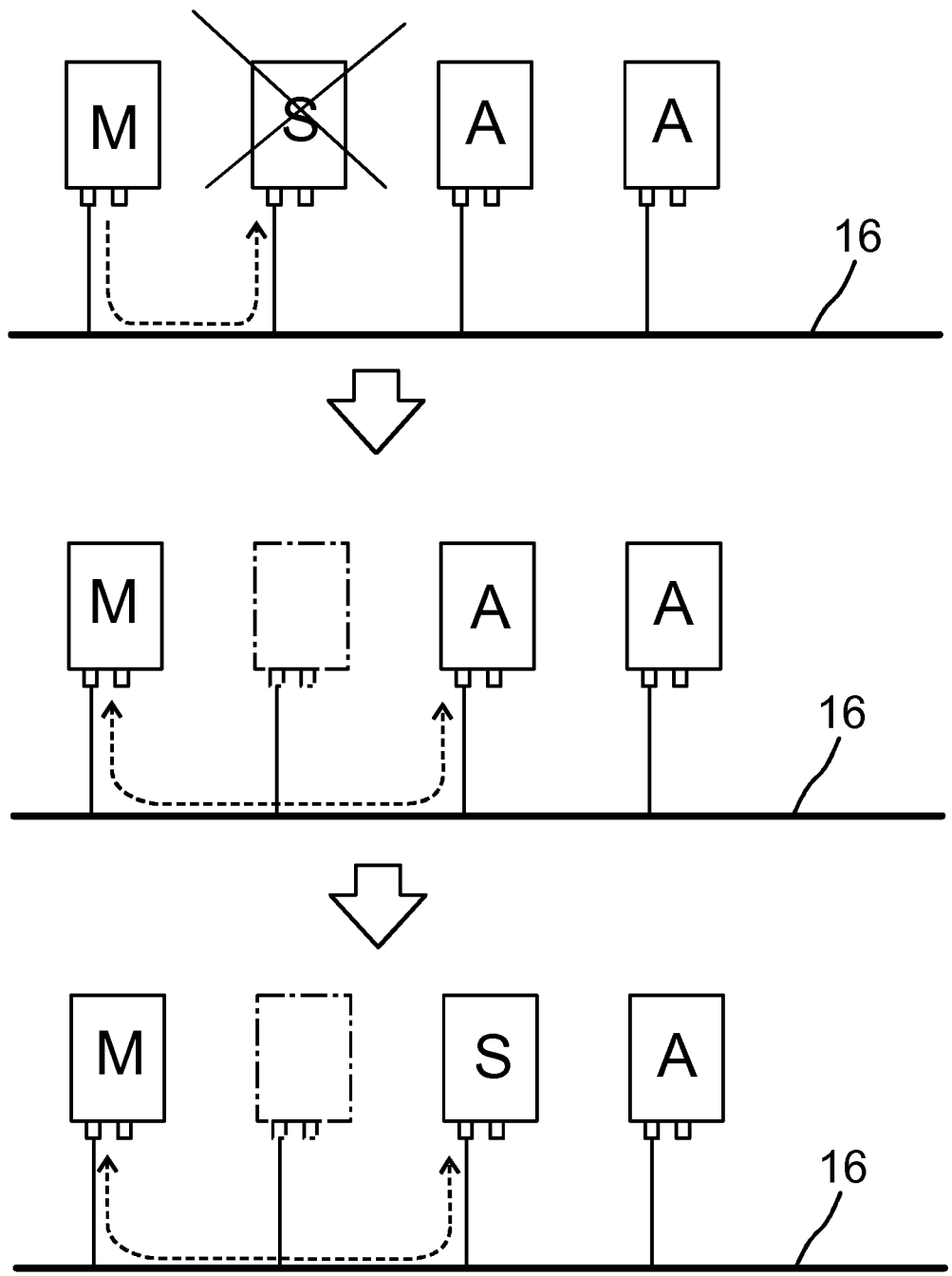
FIG. 4 is a schematic block diagram of the system of FIG. 2 in a first fail detection procedure.

A fail detection procedure is shown in FIG. 4. The object of the fail detection procedure is to provide redundancy for client communication units, where any Available unit A can replace a Slave or Master. In order for the devices to detect failures the Slave unit continuously is checking the operation of the Master unit. The Master unit correspondingly checks the status of the Slave unit. In various embodiments the Slave unit continuously is polling the Master unit.

The watchdog unit 26 (c.f. FIG. 1) of the Master unit is used as a timer that will terminate when a predefined timeout time has elapsed. The timer will be restarted on each poll request. The Master unit is required to respond to the poll request from the Slave unit with a poll response. A poll request followed by a poll response is a successful poll. A successful poll terminates and restarts the watchdog.

As long as the Slave unit S is functional poll requests continuously are received and acknowledged by the Master unit M. Should the Slave unit S come out of function or be disconnected from the local link network 16, poll requests from the Slave unit S will no longer reach the Master unit M. As a result the watchdog unit of the Master unit M will consider the Slave unit not to be functional or to be disconnected and will generate an alert signal and a search for an Available unit A will be initiated, as shown in the middle section of FIG. 4. When an Available unit A has been found the Master unit M will send role switch instructions to change the mode of operation from Available to Slave. The Slave unit S acknowledges the role switch and the situation as shown in the bottom section of FIG. 4 will appear.

Figure 5:
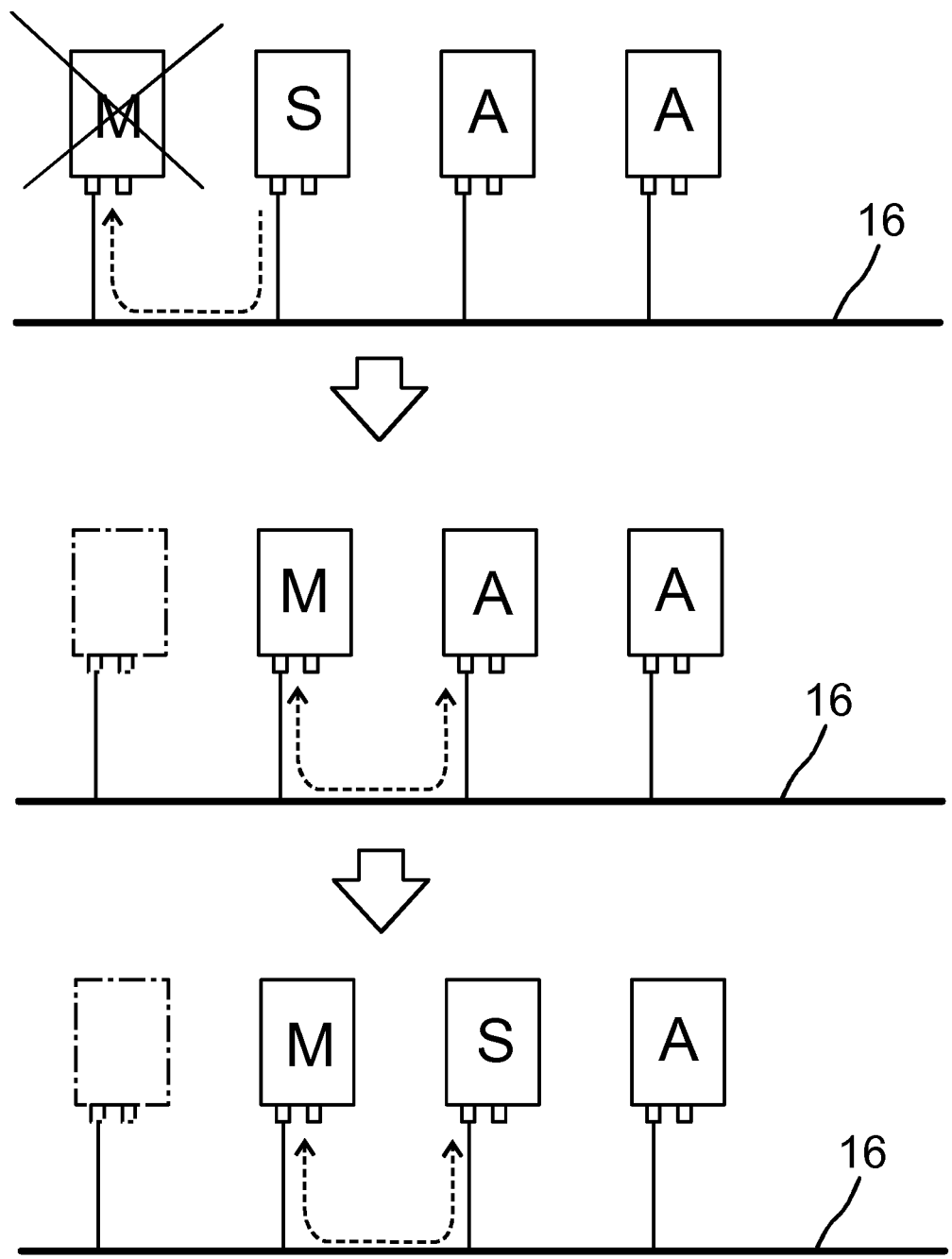
FIG. 5 is a schematic block diagram of the system of FIG. 2 in a second fail detection procedure.

Another fail situation is detected when the Slave unit S does not receive an acknowledge signal from the Master unit M after sending a poll request. This situation is shown in the top section of FIG. 5. The Slave unit S in this case will assume that the Master unit M is out of order or has become disconnected from the local link network 16. Instead, the Slave unit S elects itself as a new Master unit M as shown in the middle section of FIG. 5.

The new Master unit M then checks if there are any client communication units available in the local link network 16. If an Available unit A is located the Master unit M elects it and sends a role switch command. When the Available unit A receives the role switch command it becomes a new Slave unit S as shown in the bottom part of FIG. 5.

During all transition procedures only one client communication unit operates as a Master unit and actively is bridging traffic between the local link network and the remote network. As a result network loops cannot be formed. A second client communication unit operating as a Slave unit continuously scans for access points of the remote network. Full communication is established between the Slave unit and a new access point before traffic is switched over in a roaming procedure. Since the establishment of a new communication path is performed by another client communication unit than the client communication unit bridging traffic there are no decrease of the communication performance during this process. Furthermore, the remote network does not need to be modified in any sense because all roaming functionality is integrated at the client side.

As set out above the protocol used in accordance with the invention defines three device modes, namely Master, Slave and Available. Preferably, all client communication units reboot and start in the mode Available. Based on different timing properties one client communication unit will enter the mode Master and then elect another client communication unit in the mode Available to become a Slave unit that is controlled by the Master unit.

In various embodiments the local link network 16 is a wireless system. In various embodiments the remote network 20 is a wired system. Different combinations of wired and wireless network systems can be provided within the scope of the invention. Roaming and redundancy still can be achieved without any modifications of the systems described above.

While certain illustrative embodiments of the invention have been described in particularity, it will be understood that various other modifications will be readily apparent to those skilled in the art without departing from the scope and spirit of the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. A local communication network comprising a plurality of client communication units, each of said client communication units comprising:

a first interface unit and a second interface unit, said first interface unit being operatively connected to said local communication network and said second interface unit being operatively connected to a remote communication networks;

a bridging network unit capable of transparently bridging traffic between said local communication network and said remote communication network; and a roaming control unit comprising means for determining whether a communication path is preferred, wherein the preferred communication path exhibits improved transmission properties; wherein a first of the client communication units operates in a first mode, in which the first client communication unit bridges traffic between said local communication network and said remote communication network through a first communication path; and a second of the client communication units operates in a second mode, in which the second client communication unit scans for a second communication path alternate to the first communication path; wherein the roaming control unit of said first client communication unit is operatively connected to the second client communication unit for establishing communication through said second communication path, said second client communication unit is operatively connected to said first client communication unit for checking operational status of the first client communication unit, and said first client communication unit arranged for switching mode from said first mode to said second mode and for switching mode of said second client communication unit from said second mode to said first mode when the second communication path is determined as preferred, and for activating said bridging network unit of said second client communication unit, now operating in said first mode, to transparently bridge traffic between said local communication network and said remote communication network so as to allow only one of the first client communication unit and second client communication unit to bridge traffic at a time.

2. A local communication network as claimed in claim 1, wherein said client communication units each comprise fail detection means.

3. A local communication network as claimed in claim 2, wherein said fail detection means comprises a watch dog unit including a timer for repeatedly transmitting poll requests from the client communication units when operating in the second mode, and for acknowledging poll requests from the client communication units when operating in the first mode.

4. A method of roaming in a local communication system comprising a plurality of client communication units, said method comprising steps of:
   a) establishing a first communication path between a first of the client communication units and a remote communication network, said first client communication unit operating in a first mode,
   b) in a second of the client communication units, while operating in a second mod, continuously scanning for a second communication path for providing improved transmission properties as compared to the first communication path,
   c) in said second client communication unit, preparing and establishing the second communication path,
   d) executing roaming of communication from said first communication path to said second communication path upon a determination that the second communication path provides improved transmission properties as compared to the first communication path and said communication path with improved transmission properties is preferred,
   e) disrupting communication between said first client communication unit of said local communication system and said remote communication network so as to allow only one of the first client communication unit and second client communication unit to bridge traffic at a time,
   f) in said second client communication unit continuously monitoring said first client communication unit for fail detection and
   g) in said first client communication unit of said local communication system while operating in said second mode continuously scanning for a further communication path providing improved transmission properties as compared to said second communication path.

5. A method as claimed in claim 4, also including steps of continuously transmitting in said second client communication unit fail detection signals to said first client communication unit and changing mode of operation to said first mode on detecting a failure of said first client communication unit.

6. A method as claimed in claim 5, also including a step of transmitting a poll request from said second client communication unit to said first client communication unit when a predefined timeout time has elapsed.

7. A method as claimed in claim 4, also including steps of rebooting the local communication system, whereby the plurality of client communication units operate in a third mode of operation and act as available, and automatically changing mode of operation to the first mode in a first of the client communication units operating in the third mode.

8. A method as claimed in claim 4, also including the steps of providing a plurality of the client communication units operating in a third mode of operation and acting as available, changing mode of operation to said first mode in a first of the client communication units operating in the third mode and sending instructions from said client communication unit changed to operate in said first mode to a second of the client communication units operating in the third mode for changing mode of operation into said second mode.

9. A method as claimed in claim 4, also including the steps of
   a) providing a plurality of the client communication units operating in a third mode of operation and acting as available;
   b) continuously transmitting from said first client communication unit fail detection signals to said second client communication unit; and
   c) sending instructions from said first client communication unit to one of the client communication units operating in said third mode to change mode of operation to said second mode upon detecting a failure of said second client communication unit.

* * * * *